US009848080B2

(12) United States Patent
Huh et al.

(10) Patent No.: US 9,848,080 B2
(45) Date of Patent: Dec. 19, 2017

(54) METHOD FOR TRANSMITTING CALL DISCONNECTION MESSAGE OF ELECTRONIC APPARATUS AND ELECTRONIC APPARATUS THEREOF

(71) Applicant: Samsung Electronics Co., Ltd., Gyeonggi-do (KR)

(72) Inventors: Chang-Wan Huh, Gyeonggi-do (KR); Seung-Min Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/838,718

(22) Filed: Aug. 28, 2015

(65) Prior Publication Data

US 2016/0065733 A1 Mar. 3, 2016

(30) Foreign Application Priority Data

Sep. 1, 2014 (KR) .................. 10-2014-0115520

(51) Int. Cl.
*H04M 3/42* (2006.01)
*H04M 3/424* (2006.01)
(Continued)

(52) U.S. Cl.
CPC ....... *H04M 3/424* (2013.01); *H04M 1/72552* (2013.01); *H04W 4/14* (2013.01);
(Continued)

(58) Field of Classification Search
CPC ... H04M 3/424; H04M 1/72552; H04W 4/16; H04W 24/08; H04W 4/14; H04W 24/04; H04W 4/12; H04W 76/028
(Continued)

(56) References Cited

U.S. PATENT DOCUMENTS

2001/0056496 A1 * 12/2001 Tam .................. H04M 7/006
  709/230
2004/0203607 A1   10/2004 Satapathy
(Continued)

FOREIGN PATENT DOCUMENTS

| JP | 2007300232 A | * 11/2007 |
|---|---|---|
| KR | 10-2005-0093296 A | 9/2005 |
| KR | 10-2007-0054541 A | 5/2007 |
| KR | 10-0753364 B1 | 8/2007 |

*Primary Examiner* — Tanmay Shah
(74) *Attorney, Agent, or Firm* — Cha & Reiter, LLC

(57) ABSTRACT

In one aspect of this disclosure, a method and an electronic apparatus executing a method, the method including detecting a disconnection of a call with an external electronic apparatus, when the disconnection is detected, generating and storing a call disconnection message including a notifier indicating a cause for the disconnection, and transmitting the stored call disconnection message to the external electronic apparatus according to a communication receptivity condition. In another aspect of this disclosure, a method and an electronic apparatus comprising a communication module executing a call with an external electronic apparatus, and a processor executing the method, including detecting disconnection of the call with the external electronic apparatus, when the disconnection is detected, generating and store a call disconnection message including a notifier indicating a cause for the disconnection, and transmitting the stored call disconnection message to the external electronic apparatus according to a communication receptivity condition.

17 Claims, 15 Drawing Sheets

(51) Int. Cl.
  *H04W 76/02* (2009.01)
  *H04M 1/725* (2006.01)
  *H04W 4/14* (2009.01)
  *H04W 4/16* (2009.01)
  *H04W 24/08* (2009.01)

(52) U.S. Cl.
  CPC ............ *H04W 4/16* (2013.01); *H04W 24/08* (2013.01); *H04W 76/028* (2013.01)

(58) Field of Classification Search
  USPC .................................................... 455/414.1
  See application file for complete search history.

(56) References Cited

U.S. PATENT DOCUMENTS

| | | |
|---|---|---|
| 2004/0203645 A1 | 10/2004 | Forman et al. |
| 2007/0091792 A1* | 4/2007 | Chandra ................ H04L 45/00 370/227 |
| 2007/0147597 A1* | 6/2007 | Bangor ............ H04M 3/42068 379/207.02 |
| 2007/0259663 A1* | 11/2007 | Weintraub .............. H04W 4/24 455/433 |
| 2007/0274488 A1 | 11/2007 | Callaghan |
| 2010/0022263 A1 | 1/2010 | Stamoulis et al. |
| 2010/0120414 A1 | 5/2010 | Bellovin |
| 2012/0157164 A1 | 6/2012 | Locker et al. |
| 2015/0334584 A1* | 11/2015 | Sun ...................... H04W 24/08 455/67.11 |

\* cited by examiner

METHOD FOR TRANSMITTING CALL DISCONNECTION MESSAGE OF ELECTRONIC APPARATUS AND ELECTRONIC APPARATUS THEREOF

CLAIM OF PRIORITY

The present application claims the benefit under 35 U.S.C. §119(a) of a Korean patent application filed on Sep. 1, 2014 in the Korean Intellectual Property Office and assigned Serial number 10-2014-0115520, the entire disclosure of which is hereby incorporated by reference.

TECHNICAL FIELD

The present disclosure relates generally to a method for transmitting a call disconnection message for an electronic apparatus, and the electronic apparatus implementing the method.

BACKGROUND

A variety of electronic devices such as smart phones and tablet Personal Computers (PCs) can now provide various communication functions such as a voice call, a Short Message Service (SMS), and a Social Network Service (SNS).

A user of the electronic device, moving freely, can use the communication function of the electronic device. For example, when a user of a first electronic device and a user of a second electronic device are communicating telephonically via these electronic devices, and the user of the first electronic device enters a particular place having a poor communication receptivity such as an elevator, the telephonic communication may oftentimes be abnormally disconnected, regardless of the use-intention of the user of the first electronic device.

The call disconnection may thus be caused by an abnormal network service error. However, during the call disconnection, the user of the second electronic device may not be aware of the cause of the call disconnection, and thus an unnecessary misunderstanding may occur between the two users. The user of the second electronic device may inefficiently attempt to call the other user, who may still be disposed within the region having poor communication receptivity causing the network service error of the first electronic device.

The above information is presented as background information to assist with an understanding of the present disclosure. No determination has been made, and no assertion is made, as to whether any of the above might be applicable as prior art with regard to the present disclosure.

SUMMARY

In one aspect of the present disclosure, a method for sending a call disconnection message is provided, including transmitting a message including an explanation or reason for a call disconnection when an affected electronic apparatus, such as a smart phone or a tablet Personal Computer (PC), suffers from an abnormal call disconnection or anticipates a call disconnection. An electronic apparatus for implementing the method is also disclosed thereof.

According to one aspect of the present disclosure, a method in an electronic apparatus, including detecting a disconnection of a call with an external electronic apparatus, when the disconnection is detected, generating and storing a call disconnection message including a notifier indicating a cause for the disconnection, and transmitting the stored call disconnection message to the external electronic apparatus according to a communication receptivity condition.

According to another aspect of the present disclosure, a method in an electronic apparatus including detecting an impending call disconnection during a call with an external electronic apparatus, when the disconnection is detected, generating a call disconnection message including a notifier indicating a cause for the disconnection, and transmitting the generated call disconnection message to the external electronic apparatus.

According to yet another aspect of the present disclosure, an electronic apparatus including a communication module executing a call with an external electronic apparatus, and a processor configured to: detect disconnection of the call with the external electronic apparatus, when the disconnection is detected, generate and store a call disconnection message including a notifier indicating a cause for the disconnection, and transmit the stored call disconnection message to the external electronic apparatus according to a communication receptivity condition.

According to still another aspect of the present disclosure, an electronic apparatus including a communication module executing a call with an external electronic apparatus, and a processor configured to detect an impending call disconnection during the call with the external electronic apparatus, and when the call disconnection is detected, generate and transmit a call disconnection message to the external electronic apparatus, the call disconnection message including a notifier indicating a cause for the call disconnection.

The disclosure will become apparent to those skilled in the art from the following detailed description, which, taken in conjunction with the annexed drawings, discloses example embodiments of the disclosure.

BRIEF DESCRIPTION OF THE DRAWINGS

The example embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
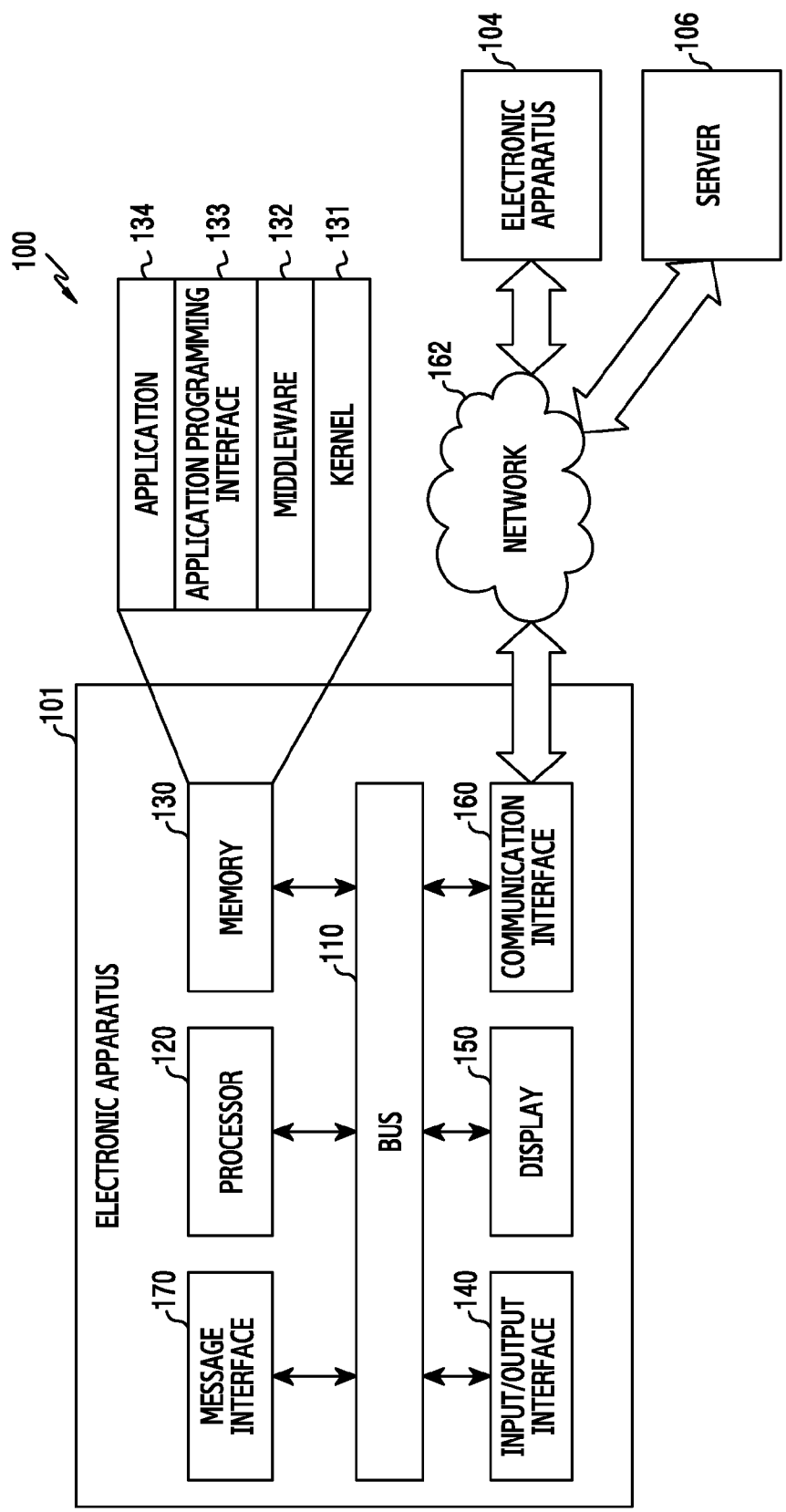
FIG. 1 illustrates a network environment including an electronic apparatus according to an example embodiment of the present disclosure.

The following description with reference to the accompanying drawings is provided to assist in a comprehensive understanding of example embodiments of the disclosure as defined by the claims and their equivalents. It includes various specific details to assist in that understanding but these are to be regarded as merely example. Accordingly, those of ordinary skill in the art will recognize that various changes and modifications of the embodiments described herein can be made without departing from the disclosure. In addition, descriptions of well-known functions and implementations may be omitted for clarity and conciseness.

As used in the present disclosure, terms such as "includes" or "may include" refer to the presence of the corresponding function, operation or feature, and do not limit the presence of additional functions, operations or features. Also, terms such as "includes" or "has" refers to the presence of characteristics, numbers, steps, operations, components or combinations thereof, and is not intended to exclude one or more additional characteristics, numbers, steps, operations, components or combinations thereof.

As used in the present disclosure, the term "or" is used to include any and all combination of terms listed. For examples, "A or B" includes only A, only B, or both A and B. As used in the present disclosure, terms such as "first" or "second" may be used to describe various features, but do not limit such features. For example, the terms do not limit the order and/or the importance of their associated features. Such terms may be used to differentiate one feature from another. For example, a first user equipment (alternatively, "UE") and a second user equipment are both user equipment, but are different user equipment. For example, without departing from the present disclosure, a first component may be called a second component, and likewise, a second component may be called a first component.

If a component is said to be "connected with" or "connected to" another component, the component may be directly connected with, or connected to, the other component, or another component may exist in between. On the other hand, if a component is said to be "directly connected with" or "directly connected to" another component, it should be understood that no components exist in between.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic apparatus according to various embodiments of the present disclosure m communication functionality. For example, the electronic apparatus can include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical appliance, a camera, or a wearable device (e.g., a Head Mounted Device (HMD) such as electronic glasses, electronic textiles, an electronic bracelet, an electronic necklace, an electronic appcessory, an electronic tattoo, or a smart watch).

According to various embodiments of the present disclosure, an electronic apparatus can be a smart home appliance having the communication functionality. The smart home appliance can include, for example, at least one of a television, a Digital Video Disk (DVD) player, an audio system, a refrigerator, an air conditioner, a vacuum cleaner, an oven, a microwave oven, a washing machine, an air purifier, a set-top box, a TV box (e.g., Samsung HomeSync™, AppleTV™, or Google TV™), a game console, an electronic dictionary, a digital key, a camcorder, or a digital frame.

According to various embodiments of the present disclosure, an electronic apparatus can include at least one of various medical appliances (e.g., Magnetic Resonance Angiography (MRA), Magnetic Resonance Imaging (MRI), Computed Tomography (CT), X-ray system, ultrasonicator)), a navigation device, a Global Positioning System (GPS) receiver, an Event Data Recorder (EDR), a Flight Data Recorder (FDR), an in-vehicle infotainment device, marine electronic equipment (e.g., a marine navigation device and a gyro compass), an avionic system, a security device, a vehicle head unit, an industrial or home robot, an Automatic Teller's Machine (ATM) of a financial company, or a Point of Sale (POS) of a store.

According to various embodiments of the present disclosure, an electronic apparatus can include at least one of part of furniture or building/structure having the communication functionality, an electronic board, an electronic signature receiving device, a projector, or various gauges (e.g., gauges for water, electricity, gas, and radio waves). An electronic apparatus according to various embodiments of the present disclosure can be one or a combination of those various devices. The electronic apparatus can be a flexible device. Also, those skilled in the art should understand that the electronic apparatus is not limited to those devices.

Hereinafter, example embodiments of the present disclosure provide an electronic apparatus by referring to the attached drawings. The term 'user' used in embodiments of the present disclosure can represent a person or a device (e.g., an artificial intelligent electronic apparatus) who or which uses the electronic apparatus.

FIG. 1 depicts a network environment 100 including an electronic apparatus 101 according to an example embodiment of the present disclosure. Referring to FIG. 1, the electronic apparatus 101 can include a bus 110, a processor 120, a memory 130, an input/output interface 140, a display 150, a communication interface 160, and a message interface 170.

The communication interface 160 is a communication module for receiving or generating a voice call. The communication interface 160 can include a traditional circuit and a data connection for the voice call using an Internet phone or a Voice over Internet Protocol (VoIP) phone.

When the electronic apparatus 101 faces an abnormal call disconnection or anticipates a call disconnection, the message interface 170 generates a call disconnection message including a comment indicating a call disconnection cause. The message interface can be included in the processor 120 or stand separately in association with the processor 120.

The message interface 170 continuously monitors a Received Signal Strength Indication (RSSI). When the RSSI becomes zero or falls below a preset reference value, the message interface 170 can determine that the call disconnection occurred due to a poor communication environment (e.g., poor receptivity) and/or anticipate the call disconnection. The message interface 170 can monitor a network service error, and determine or anticipate the call disconnection due to a network service error.

The bus 110 can be a circuit for interlinking the above-stated components and transferring communications (e.g., control messages) between the above-stated components. The processor 120 can, for example, receive an instruction from the other components (e.g., the memory 130, the input/output interface 140, the display 150, and the communication interface 160) via the bus 110, interpret the received instruction, and perform an operation or a data processing according to the interpreted instruction.

The memory 130 can store the instruction or the data received from or generated by the processor 120 or the other components (e.g., the input/output interface 140, the display 150, or the communication interface 160). For example, the memory 130 can include programming modules of a kernel 131, a middleware 132, an Application Programming Interface (API) 133, and an application 134. The programming modules can be implemented using software, firmware, or hardware, alone or in combination.

The kernel 131 can control or manage system resources (e.g., the bus 110, the processor 120, or the memory 130) used to execute the operation or the function of the other programming modules, for example, the middleware 132, the API 133, or the application 134. Also, the kernel 131 can provide an interface allowing the middleware 132, the API 133, or the application 134 to access and to control or manage the individual component of the electronic apparatus 101.

The middleware 132 can relay data between the API 133 or the application 134 and the kernel 131. Also, for work requests received from the application 134, the middleware 132 can, for example, control (e.g., schedule or load balance) the work requests by giving priority of the system resource (e.g., the bus 110, the processor 120, or the memory 130) of the electronic apparatus 101 to at least one application of the application 134.

The API 133, which is an interface for the application 134 to control the function provided from the kernel 131 or the middleware 132, can include at least one interface or function (e.g., instruction) for, for example, file control, window control, image processing, or text control.

The application 134 can include a Short Message Service (SMS/Multimedia Messaging Service (MMS) application, an e-mail application, a calendar application, an alarm application, a health care application (e.g., an application for measuring an exercise or a blood sugar level), or an environment information application (e.g., an application for providing air pressure, humidity, or temperature information). Additionally or alternatively, the application 134 can be an application relating to information exchange between the electronic apparatus 101 and an external electronic apparatus (e.g., an electronic apparatus 104). The information exchange application can include, for example, a notification relay application for relaying particular information to the external electronic apparatus, or a device management application for managing the external electronic apparatus.

For example, the notification relay application can relay notification information of the other application (e.g., the SMS/MMS application, the e-mail application, the health care application, or the environment information application) of the electronic apparatus 101 to the external electronic apparatus (e.g., the electronic apparatus 104). Additionally or alternatively, the notification relay application can receive and forward the notification information from the external electronic apparatus (e.g., the electronic apparatus 104) to the user. The device management application can manage (e.g., install, delete, or update) at least part of the function (e.g., turn-on/turn-off of the external electronic apparatus (or some components) or display brightness (or resolution) control) of the external electronic apparatus (e.g., the electronic apparatus 104) communicating with the electronic apparatus 101, the application running on the external electronic apparatus, or a service (e.g., a call service or a message service) provided by the external electronic apparatus.

The application 134 can include an application designated based on an attribute (e.g., a type of the electronic apparatus) of the external electronic apparatus (e.g., the electronic apparatus 104). For example, when the external electronic apparatus is an MP3 player, the application 134 can include an application relating to music play. Similarly, when the external electronic apparatus is a mobile medical device, the application 134 can include an application relating to the health care. The application 134 can include at least one of the applications designated in the electronic apparatus 101 or the application received from the external electronic apparatus (e.g., a server 106 or the electronic apparatus 104).

The input/output interface 140 can forward the instruction or the data input from the user through an input/output device (e.g., a sensor, a keyboard, or a touch screen) to, for example, the processor 120, the memory 130, or the communication interface 160 via the bus 110. For example, the input/output interface 140 can forward user's touch data input through the touch screen, to the processor 120. Also, the input/output interface 140 can output the instruction or the data received from the processor 120, the memory 130, or the communication interface 160 via the bus 10, through the input/output device (e.g., a speaker or a display). For example, the input/output interface 140 can output voice data processed by the processor 120 to the user through the speaker.

The display 150 can display various information (e.g., multimedia data or text data) to the user. The communication interface 160 can connect the communication between the electronic apparatus 101 and the external device (e.g., the electronic apparatus 104 or the server 106). For example, the communication interface 160 can communicate with the external device over a network 162 using wireless communication or wired communication. For example, the wireless communication can include at least one of Wireless Fidelity (WiFi), Bluetooth (BT), Near Field Communication (NFC), GPS, and cellular communication (e.g., Long Term Evolution (LTE), LTE-Advanced (LTE-A), Wideband Code Division Multiple Access (WCDMA), Universal Mobile Telecommunications System (UMTS), Wireless Broadband (WiBro), or Global System for Mobile Communications (GSM)). The wired communication can include at least one of, for example, Universal Serial Bus (USB), High Definition Multimedia Interface (HDMI), Recommended Standard (RS) 232, or Plain Old Telephone Service (POTS).

The network 162 can be a telecommunications network. The telecommunications network can include at least one of a computer network, Internet, Internet of things, or a telephone network. A protocol (e.g., transport layer protocol, data link layer protocol, or physical layer protocol) for the communication between the electronic apparatus 101 and the external device can be supported by at least one of the application 134, the API 133, the middleware 132, the kernel 131, or the communication interface 160.

Figure 2:
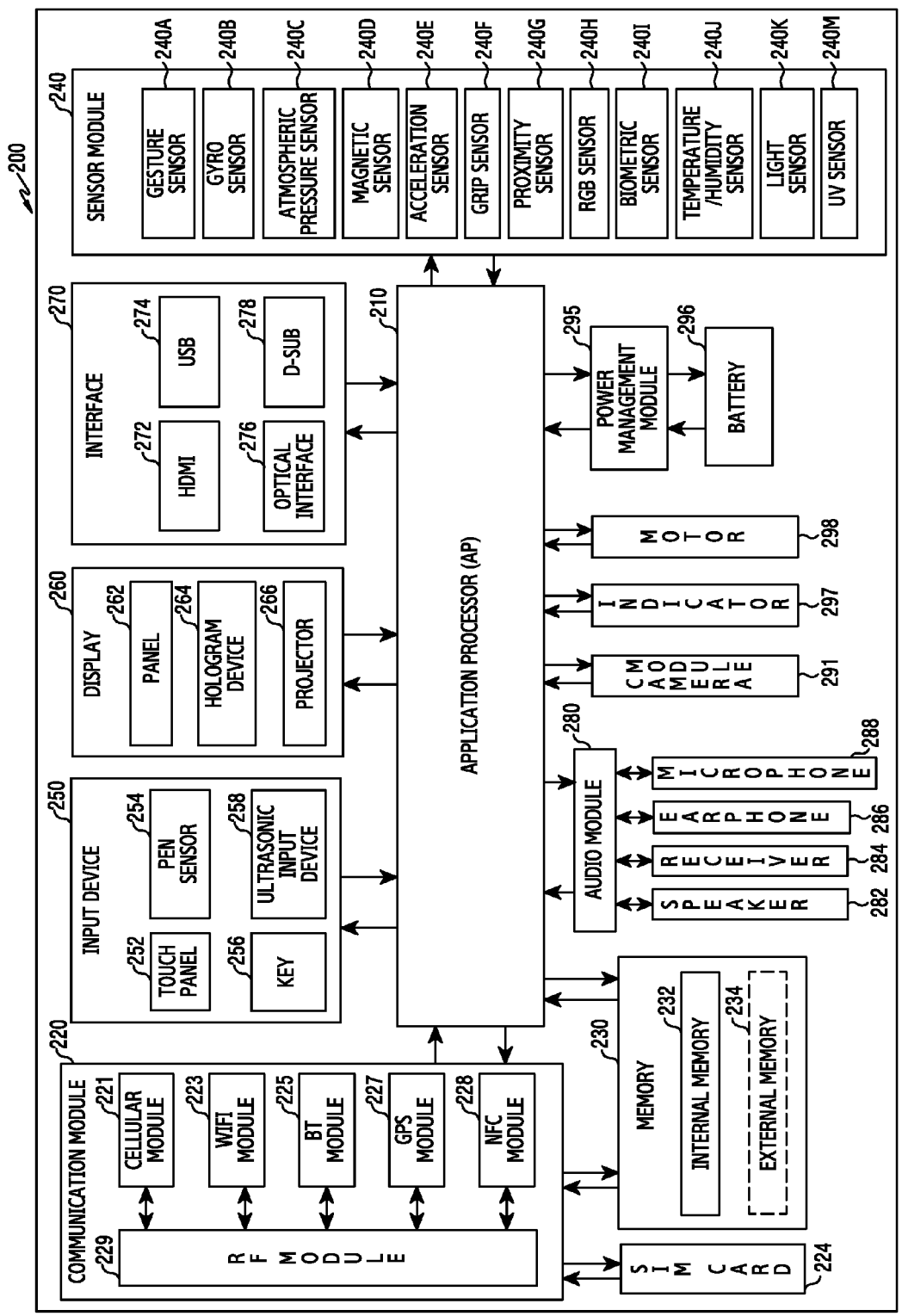
FIG. 2 illustrates an electronic apparatus according to an example embodiment of the present disclosure.

FIG. 2 is a block diagram of an electronic apparatus 200 according to an example embodiment of the present disclosure. The electronic apparatus 200 can configure whole or part of the electronic apparatus 101 of FIG. 1. Referring to FIG. 2, the electronic apparatus 200 can include one or more Application Processors (APs) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 can control hardware or software components connected to the AP 210 by driving an operating system or an application program, and carry out various data processing and operations including multimedia data. The AP 210 can be implemented using, for example, a System on Chip (SoC). The AP 210 can further include a Graphic Processing Unit (GPU) (not shown).

The communication module 220 (e.g., the communication interface 160) can transmit and receive data in the communication between the electronic apparatus 200 (e.g., the electronic apparatus 101) and the other electronic apparatuses (e.g., the electronic apparatus 104 or the server 106) connected over the network. The communication module 220 can include a cellular module 221, a WiFi module 223, a BT module 225, a GPS module 227, an NFC module 228, and a Radio Frequency (RF) module 229.

The cellular module 221 can provide a voice call, a video call, a text message service, or an Internet service over the communication network (e.g., LTE, LTE-A, CDMA, WCDMA, UMTS, WiBro, or GSM). Also, the cellular module 221 can identify and authenticate the electronic apparatus in the communication network using the SIM (e.g., the SIM card 224). The cellular module 221 can perform at least part of functions provided by the AP 210. For example, the cellular module 221 can perform at least part of a multimedia control function.

The cellular module 221 can include a Communication Processor (CP). The cellular module 221 can be implemented using, for example, the SoC. While the components of the cellular module 221 (e.g., the CP), the memory 230, and the power management module 295 are separated from the AP 210 in FIG. 2, the AP 210 can include at least part (e.g., the cellular module 221) of the above-stated components.

The AP 210 or the cellular module 221 (e.g., the CP) can load and process the instruction or the data received from its connected non-volatile memory or at least one of the other components, in a volatile memory. Also, the AP 210 or the cellular module 221 can store data received from or generated by at least one of the other components, in the non-volatile memory.

The WiFi module 223, the BT module 225, the GPS module 227, or the NFC module 228 each can include, for example, a processor for processing the data transmitted and received via the corresponding module. While the cellular module 221, the WiFi module 223, the BT module 225, the GPS module 227, and the NFC module 228 are separated from each other in FIG. 2, at least part (e.g., at least two) of the cellular module 221, the WiFi module 223, the BT module 225, the GPS module 227, and the NFC module 228 can be included in a single Integrated Chip (IC) or an IC package. For example, at least part (e.g., the CP corresponding to the cellular module 221 and the WiFi processor corresponding to the WiFi module 223) of the processors corresponding to the cellular module 221, the WiFi module 223, the BT module 225, the GPS module 227, and the NFC module 228 can be implemented using a single SoC.

The RF module 229 can transmit and receive the data, for example, RF signals. The RF module 229 can include, for example, a transceiver, a Power Amp Module (PAM), a frequency filter, and a Low Noise Amplifier (LNA), which are not shown. Also, the RF module 229 can further include a component, for example, a conductor or a conducting wire, for sending and receiving electromagnetic waves in free space during the wireless communication. While the cellular module 221, the WiFi module 223, the BT module 225, the GPS module 227, and the NFC module 228 share the single RF module 229 in FIG. 2, at least one of the cellular module 221, the WiFi module 223, the BT module 225, the GPS module 227, or the NFC module 228 can transmit and receive the RF signals via a separate RF module.

The SIM card 224 can be a card including the SIM and inserted to a slot formed at a specific location of the electronic apparatus. The SIM card 224 can include unique identification information (e.g., Integrated Circuit Card Identifier (ICCID)) or subscriber information (e.g., International Mobile Subscriber Identity (IMSI)).

The memory 230 (e.g., the memory 130) can include an internal memory 232 or an external memory 234. For example, the internal memory 232 can include at least one of the volatile memory (e.g., Dynamic RAM (DRAM), Static RAM (SRAM), Synchronous Dynamic RAM (SDRAM)) and the non-volatile memory (e.g., One-Time Programmable ROM (OTPROM), Programmable ROM (PROM), Erasable or Programmable ROM (EPROM), Electrically Erasable and Programmable ROM (EEPROM), mask ROM, flash ROM, NAND flash memory, or NOR flash memory).

The internal memory 232 can be a Solid State Drive (SSD). The external memory 234 can include a flash drive, for example, a Compact Flash (CF), a Secure Digital (SD), a Micro-Secure Digital (SD), a Mini-SD, an extreme digital (xD), or a memory stick. The external memory 234 can be functionally connected to the electronic apparatus 200 via various interfaces. The electronic apparatus 200 can further include a storage device (or a storage medium) such as hard drive.

The sensor module 240 can measure a physical quantity or detect an operation status of the electronic apparatus 200, and convert the measured or detected information to an electric signal. The sensor module 240 can include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., Red Green Blue (RGB) sensor), a biometric sensor 240I, a temperature/humidity sensor 240J, a light sensor 240K, or an UltraViolet (UV) sensor 240M. Additionally or alternatively, the sensor module 240 can include, for example, an E-noise sensor (not shown), an electromyography (EMG) sensor (not shown), an electroencephalogram (EEG) sensor (not shown), an electrocardiogram (ECG) sensor (not shown), an Infra Red (IR) sensor (not shown), an iris sensor (not shown), or a finger print sensor (not shown). The sensor module 240 can further include a control circuit for controlling its one or more sensors.

The input device 250 can include a touch panel 252, a (digital) pen sensor 254, a key 256, and an ultrasonic input device 258. For example, the touch panel 252 can recognize touch input using at least one of capacitive, resistive, infrared, or ultrasonic wave techniques. Also, the touch panel 252 may further include a control circuit. The capacitive type can recognize physical contact or proximity. The touch panel 252 may further include a tactile layer. In this case, the touch panel 252 can provide a tactile response to the user.

The (digital) pen sensor 254 can be implemented using, for example, the same or similar method as or to the user's touch input, or using a separate recognition sheet. For example, the key 256 can include, for example, a physical button, an optical key, or a keypad. The ultrasonic input device 258 is a device capable of obtaining data by detecting microwaves through a microphone (e.g., a microphone 288) in the electronic apparatus 200 through an input tool which generates an ultrasonic signal, allows radio frequency identification. The electronic apparatus 200 may receive user input from an external device (e.g., a computer or a server) connected using the communication module 220.

The display 260 (e.g., the display 150) can include a panel 262, a hologram device 264, or a projector 266. The panel 262 can employ, for example, a Liquid-Crystal Display (LCD) or an Active-Matrix Organic Light-Emitting Diode (AMOLED). The panel 262 can be implemented, for example, flexible, transparent, or wearables. The panel 262 may be implemented as the single module with the touch panel 252. The hologram device 264 can present a three-dimensional image in the air using interference of light. The projector 266 can display the image by projecting the light onto a screen. The screen can be placed, for example, inside or outside the electronic apparatus 200. The display 260 can further include a control circuit for controlling the panel 262, the hologram device 264, or the projector 266.

The interface 270 can include, for example, an HDMI 272, a USB 274, an optical interface 276, or a D-subminiature (D-sub) 278. The interface 270 can be included in, for example, the communication interface 160 of FIG. 1. Additionally or alternatively, the interface 270 can include, for example, Mobile High-Definition Link (MHL) interface, Secure Digital (SD) card/Multi-Media Card (MMC) interface, or Infrared Data Association (IrDA) standard interface.

The audio module 280 can convert sound to an electric signal and vice versa. At least part of the audio module 280 can be included in, for example, the input/output interface 140 of FIG. 1. The audio module 280 can process sound information which is input or output through, for example, a speaker 282, a receiver 284, an earphone 286, or the microphone 288.

The camera module 291 is a device for capturing a still picture and a moving picture, and can include one or more image sensors (e.g., a front sensor or a rear sensor), a lens (not shown), an Image Signal Processor (ISP) (not shown), or a flash (e.g., LED or xenon lamp) (not shown). The power management module 295 can manage power of the electronic apparatus 200. The power management module 295 can include, although not depicted, for example, a Power Management Integrated Circuit (PMIC), a charger Integrated Circuit (IC), or a battery fuel gauge.

The PMIC can be mounted in, for example, an IC or a SoC conductor. The charging type can be divided to a wired type and a wireless type. The charger IC can charge the battery, and prevent over-voltage or over-current flow from the charger. The charger IC can include a charger IC for at least one of the wired charging type or the wireless charging type. The wireless charging type includes, for example, a magnetic resonance type, a magnetic induction type, or a microwave type, and can add an additional circuit for the wireless charging, for example, a circuit such as coil loop, resonance circuit, or rectifier.

The battery gauge can, for example, measure the remaining capacity of the battery 296 and the voltage, the current, or the temperature of the charging. The battery 296 can store or generate electricity, and supply the power to the electronic apparatus 200 using the stored or generated electricity. The battery 296 can include, for example, a rechargeable battery or a solar battery The indicator 297 can display a specific status of the electronic apparatus 200 or its part (e.g., the AP 210), for example, booting state, message state, or charging state. The motor 298 can convert the electric signal to a mechanic vibration. Although it is not depicted, the electronic apparatus 200 can include a processing device (e.g., a GPU) for supporting mobile TV. The processing device for supporting the mobile TV can process media data in conformity to a standard, for example, Digital Multimedia Broadcasting (DMB), Digital Video Broadcasting (DVB), or media flow.

The aforementioned components of the electronic apparatus according to various example embodiments of the present disclosure each can include one or more components, and the name of the corresponding component can differ according to the type of the electronic apparatus. The present electronic apparatus can include at least one of the aforementioned components, omit some components, or further include other components. Also, some of the components of the present electronic apparatus can be united into a single entity to thus carry out the same functions of the corresponding components.

Now, example embodiments of the present disclosure provide a method for sending a call disconnection message of an electronic apparatus, and the electronic apparatus thereof.

The electronic apparatus can embrace various electronic apparatuses such as a smart phone or a tablet PC, and include whole or part of the components of FIG. 1 and FIG. 2. The message interface 170 of FIG. 1 can be included in the processor 120 of FIG. 1.

Figure 3:
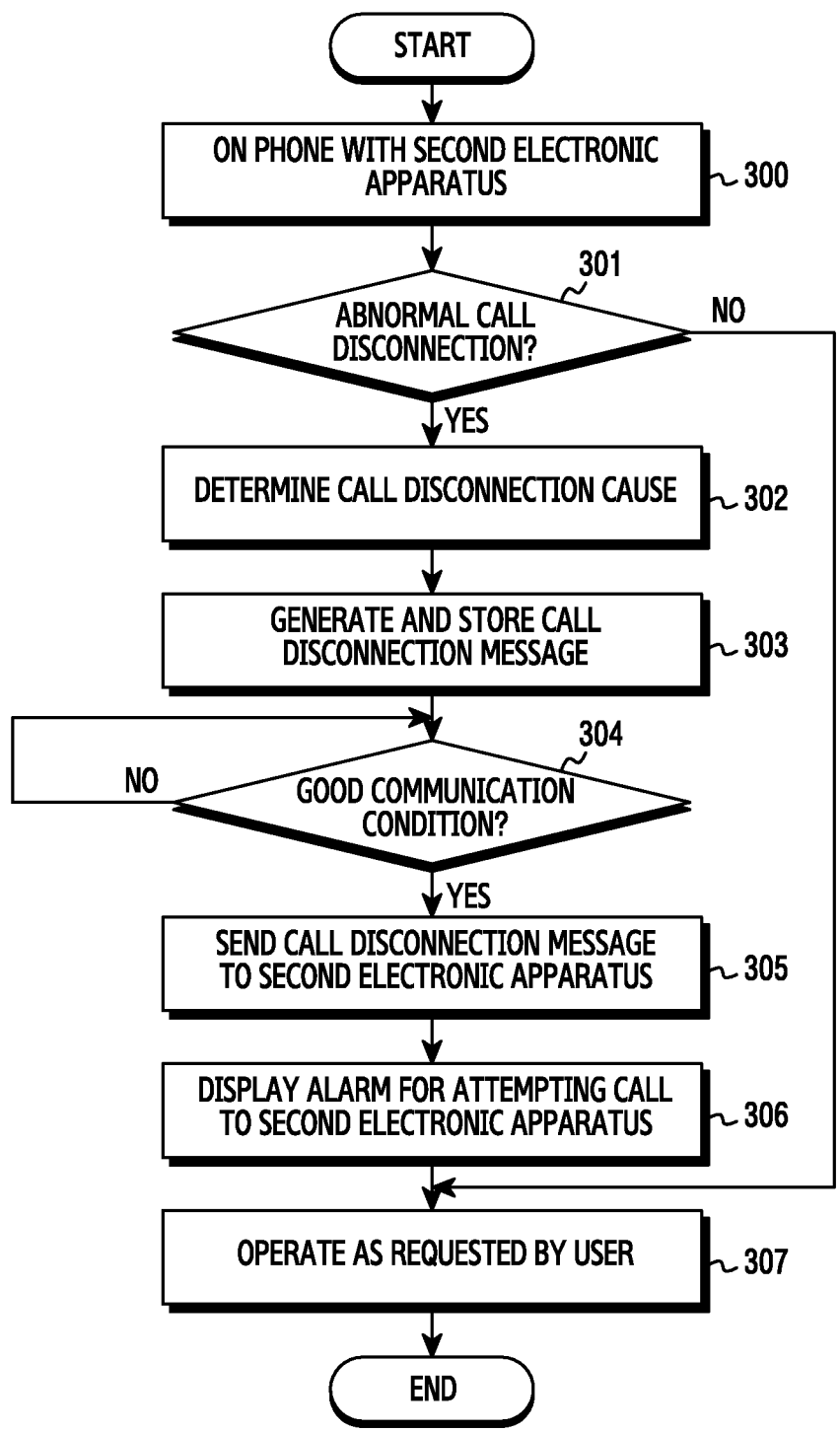
FIG. 3 illustrates a method for sending a call disconnection message in an electronic apparatus according to an example embodiment of the present disclosure.

FIG. 3 is a flowchart of a method for sending a call disconnection message in an electronic apparatus according to an example embodiment of the present disclosure. Referring to FIG. 3, for example, the processor 120 of the first electronic apparatus can make a call to the second electronic apparatus in operation 300.

When an abnormal call disconnection occurs in operation 301, the processor 120 of the first electronic apparatus can determine a cause of the call disconnection in operation 302. For example, when a user of the first electronic apparatus in telephonic communication with a user of the second electronic apparatus enters a particular place having poor communication receptivity condition such as an elevator, a Received Signal Strength Indication (RSSI) of the first electronic apparatus abruptly falls. Hence, an abnormal call disconnection can arise regardless of a use-intention of the user of the first electronic apparatus.

When the call is disconnected, the processor 120 of the first electronic apparatus checks the RSSI at the disconnection. When the RSSI is zero or falls below a preset reference value (e.g., 10%), the processor 120 of the first electronic apparatus can determine that the poor communication receptivity condition was the cause of the abnormal call disconnection.

In operation 303, the processor 120 of the first electronic apparatus generates and stores a call disconnection message including a comment indicating the abnormal call disconnection cause. In a normal communication receptivity condition, (such as, for example, when the RSSI of the first electronic apparatus exceeds the reference value; e.g., 10%) in operation 304, the processor 120 of the first electronic apparatus can detect the good communication receptivity condition and transmit the stored call disconnection message to the second electronic apparatus in operation 305.

In operation 306, the processor 120 of the first electronic apparatus can display an alarm message querying the user as to whether to attempt calling the second electronic apparatus. In operation 307, the processor 120 of the first electronic apparatus may or may not execute the redialing function, as requested by the user.

Figure 4:
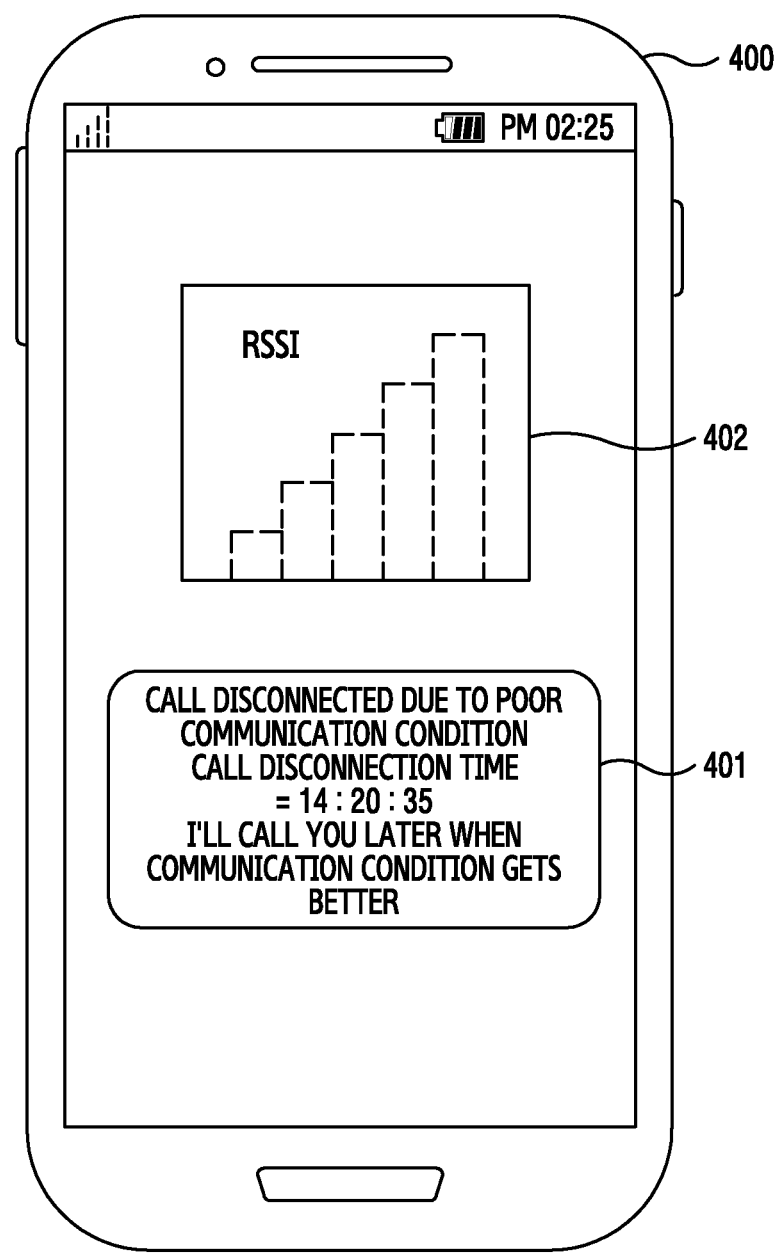
FIG. 4 illustrates a screen displaying a call disconnection message according to an example embodiment of the present disclosure.

For example, the second electronic apparatus 400 receiving the call disconnection message can display the comment about the call, indicating that it was disconnected because of the poor communication receptivity condition, a time at which the call was disconnected time, and a call disconnection message 401 including any desired message or communication, such as "I'll call you later when the communication gets better" (e.g., when reception improves), as shown in FIG. 4.

The second electronic apparatus may also display a particular image 402 indicating the poor communication receptivity condition causing the call disconnection.

Figure 5:
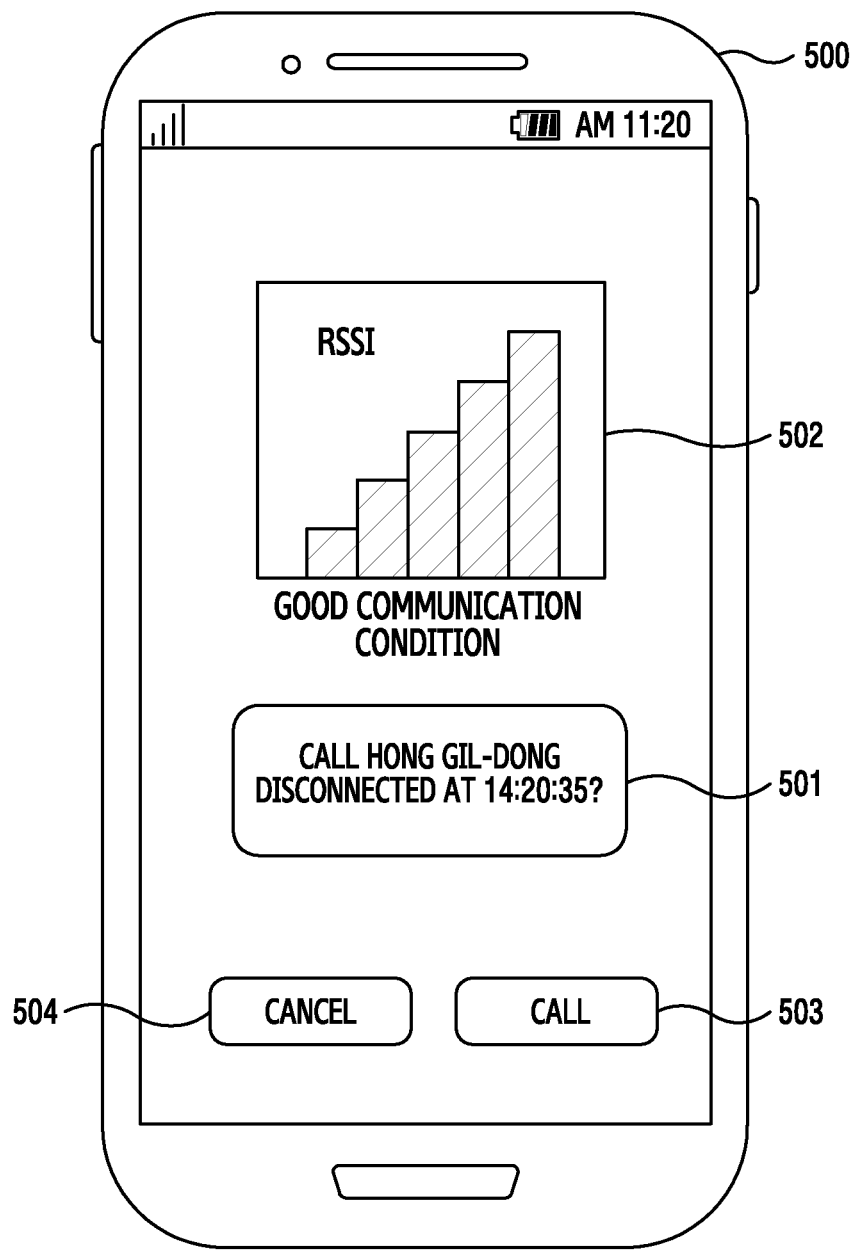
FIG. 5 illustrates a screen displaying an alarm message according to an example embodiment of the present disclosure.

Referring now to FIG. 5, when the communication condition improves, the first electronic apparatus 500 may display a call disconnection time and an alarm message 501 querying whether to attempt redialing the user of the second electronic apparatus, as shown in FIG. 5. The first electronic apparatus 500 can also display a particular image 502 indicating a good communication receptivity condition, an option 503 allowing the user of the first electronic apparatus 500 to redial the second electronic apparatus, and a cancel option 504 terminating relevant functions.

When the current call is disconnected due to a network service error, for example, when the call is disconnected when the RSSI is sufficiently greater than the designated reference value, the processor 120 of the first electronic apparatus may determine that the call disconnection was caused by a network service error.

When a temporary network service disconnection is repeated over a reference number of times (e.g., five times) within a certain time (e.g., five seconds), the processor 120 of the first electronic apparatus may determine that the call was disconnected as a result of the network service error.

The processor 120 of the first electronic apparatus may generate and store a call disconnection including a comment indicating that the network service error caused the abnormal call disconnection. When the network service has recovered, the processor 120 of the first electronic apparatus can send the stored call disconnection message to the second electronic apparatus.

Figure 6:
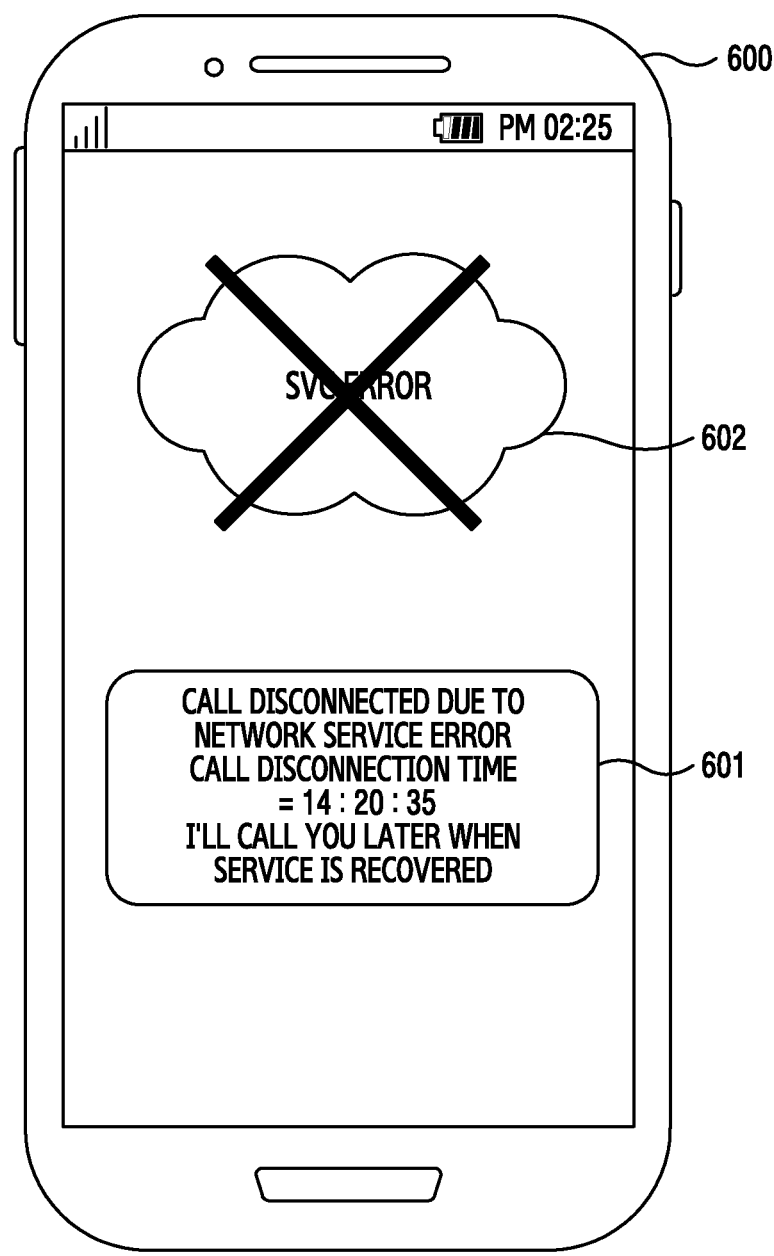
FIG. 6 illustrates a screen displaying a call disconnection message according to another example embodiment of the present disclosure.

For example, referring now to FIG. 6, a second electronic apparatus 600 receiving the call disconnection message can display a comment about the call disconnected by the network service error, a call disconnection time, and a call disconnection message 601 of various content, such as "I'll call you later when the network service is recovered" as shown in FIG. 6. The second electronic apparatus 600 can also display a particular image 602 indicating the network service error causing the call disconnection.

Figure 7:
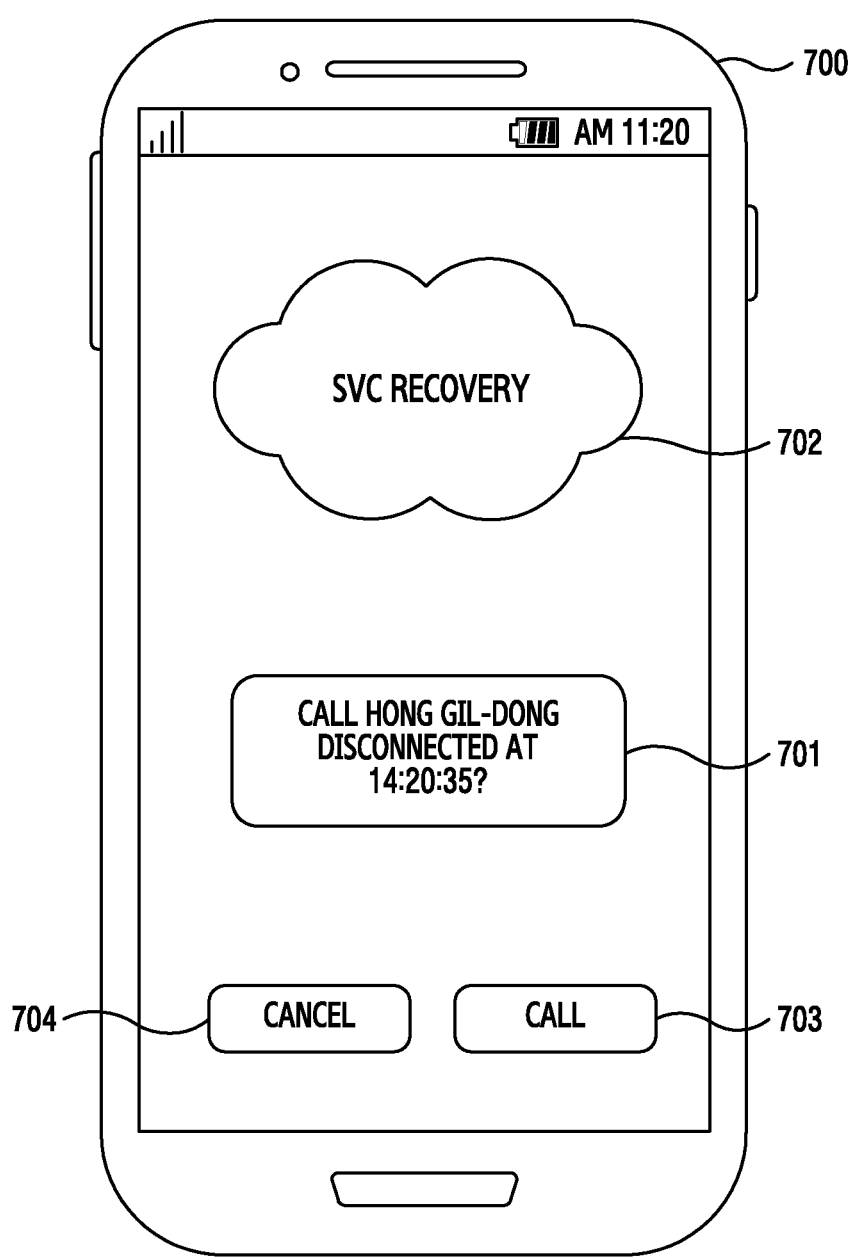
FIG. 7 illustrates a screen displaying an alarm message according to another example embodiment of the present disclosure.

Referring now to FIG. 7, when the network service recovers, the first electronic apparatus 700 can display the call disconnection time and an alarm message 701 querying as to whether to attempt redialing the user of the second electronic apparatus, as shown in FIG. 7. The first electronic apparatus 700 may also display a particular image 702 indicating the network service recovery, an option 703 allowing the user of the first electronic apparatus 700 to easily redial the second electronic apparatus, and a cancel option 704 terminating relevant functions.

Figure 8:
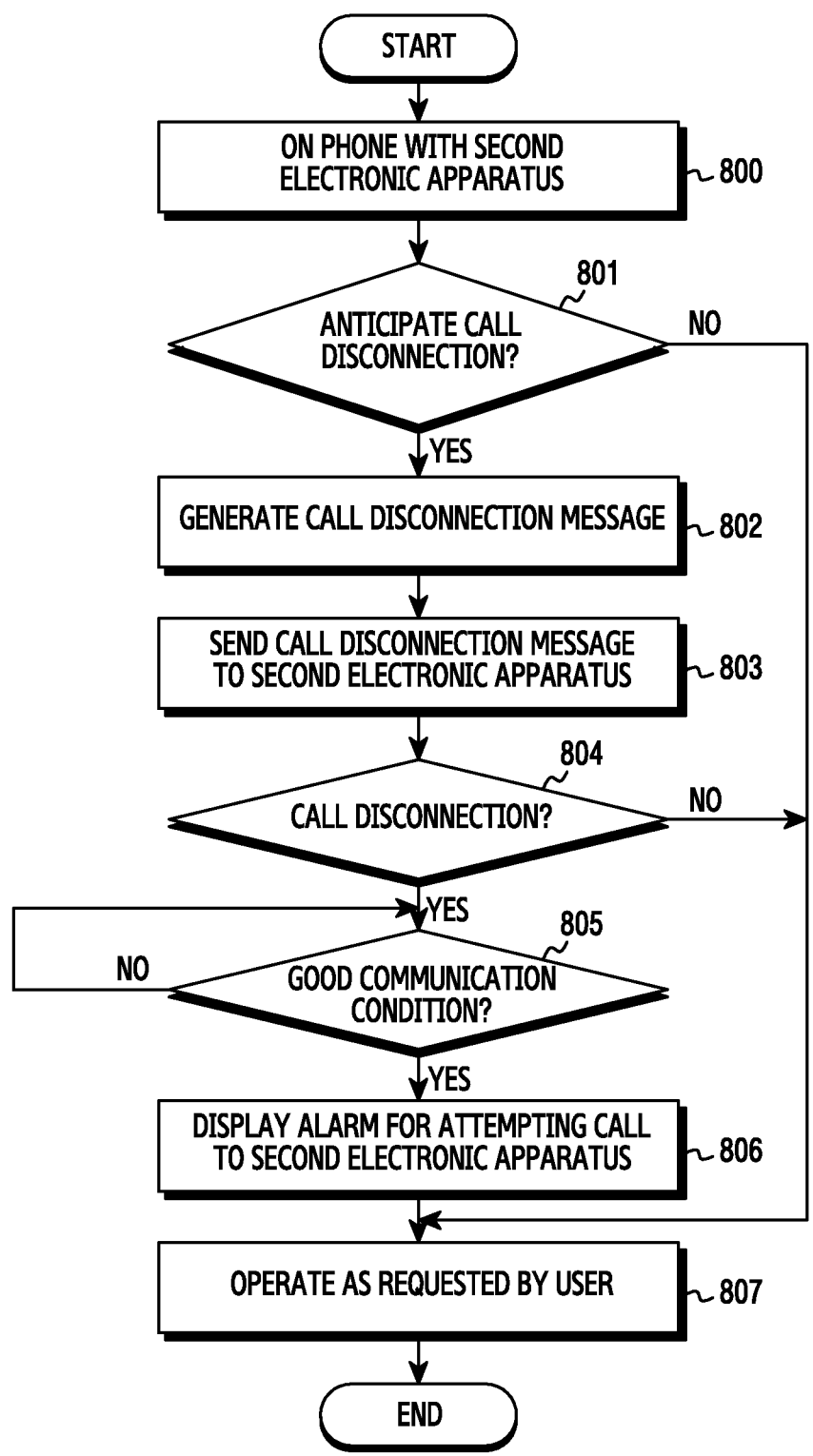
FIG. 8 illustrates a method for sending a call disconnection message in an electronic apparatus according to another example embodiment of the present disclosure.

FIG. 8 is a flowchart of a method for sending a call disconnection message in an electronic apparatus according to another example embodiment of the present disclosure. Referring to FIG. 8, the processor 120 of the first electronic apparatus can make a call to the second electronic apparatus in operation 800. When anticipating an abnormal call disconnection in operation 801, the processor 120 of the first electronic apparatus can determine a call disconnection cause and then generate a call disconnection message in operation 802.

For example, when a user of the first electronic apparatus in telephonic communication with a user of the second electronic apparatus enters a particular place having poor communication receptivity condition, such as an elevator, an RSSI of the first electronic apparatus abruptly falls. As a result, an abnormal call disconnection may arise regardless of a use-intention of the user of the first electronic apparatus.

When the RSSI abruptly falls (such, as for example, when the RSSI is zero or falls below the preset reference value), the processor 120 of the first electronic apparatus can anticipate the call disconnection and determine that the poor communication receptivity condition was the cause of the call disconnection.

In operation 803, the processor 120 of the first electronic apparatus can generate a call disconnection message including a comment indicating the cause of the abnormal call disconnection, and transmit the call disconnection message to the second electronic apparatus.

When the call is disconnected in operation 804 and the communication condition improves in operation 805 (such as, for example, when the RSSI of the first electronic apparatus sufficient recovers as to exceed the reference value), the processor 120 of the first electronic apparatus may detect a good communication receptivity condition, and display an alarm message querying as to whether to attempt redial of the second electronic apparatus in operation 806. In operation 807, the processor 120 of the first electronic apparatus can execute the relevant function (such as redialing), as requested by the user.

Figure 9:
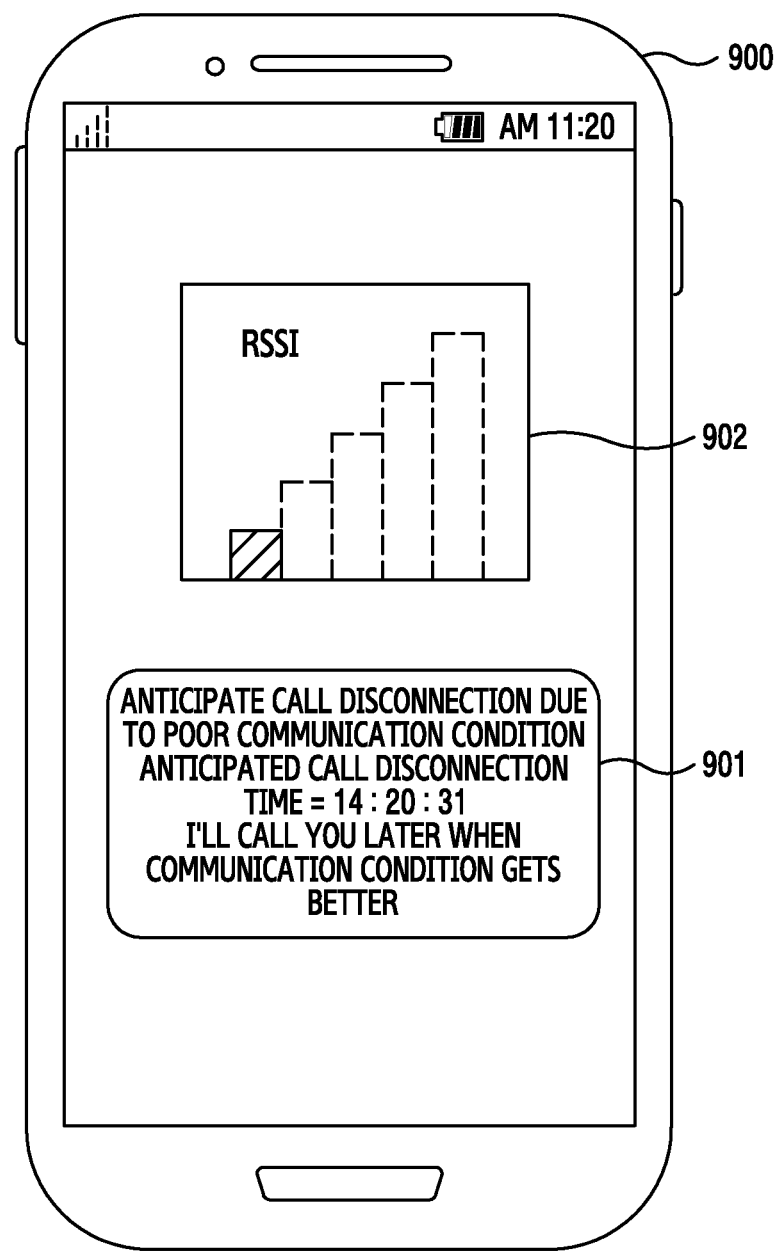
FIG. 9 illustrates a screen displaying a call disconnection message according to yet another example embodiment of the present disclosure.

Referring now to FIG. 9, for example, a second electronic apparatus 900 that receives the call disconnection message may display a comment about the call disconnected by the poor communication condition, a call disconnection time, and a call disconnection message 901 of various contents such as "I'll call you later when the communication gets better" as shown in FIG. 9. The second electronic apparatus 900 can also display a particular image 902 indicating the poor communication condition causing the call disconnection.

Figure 10:
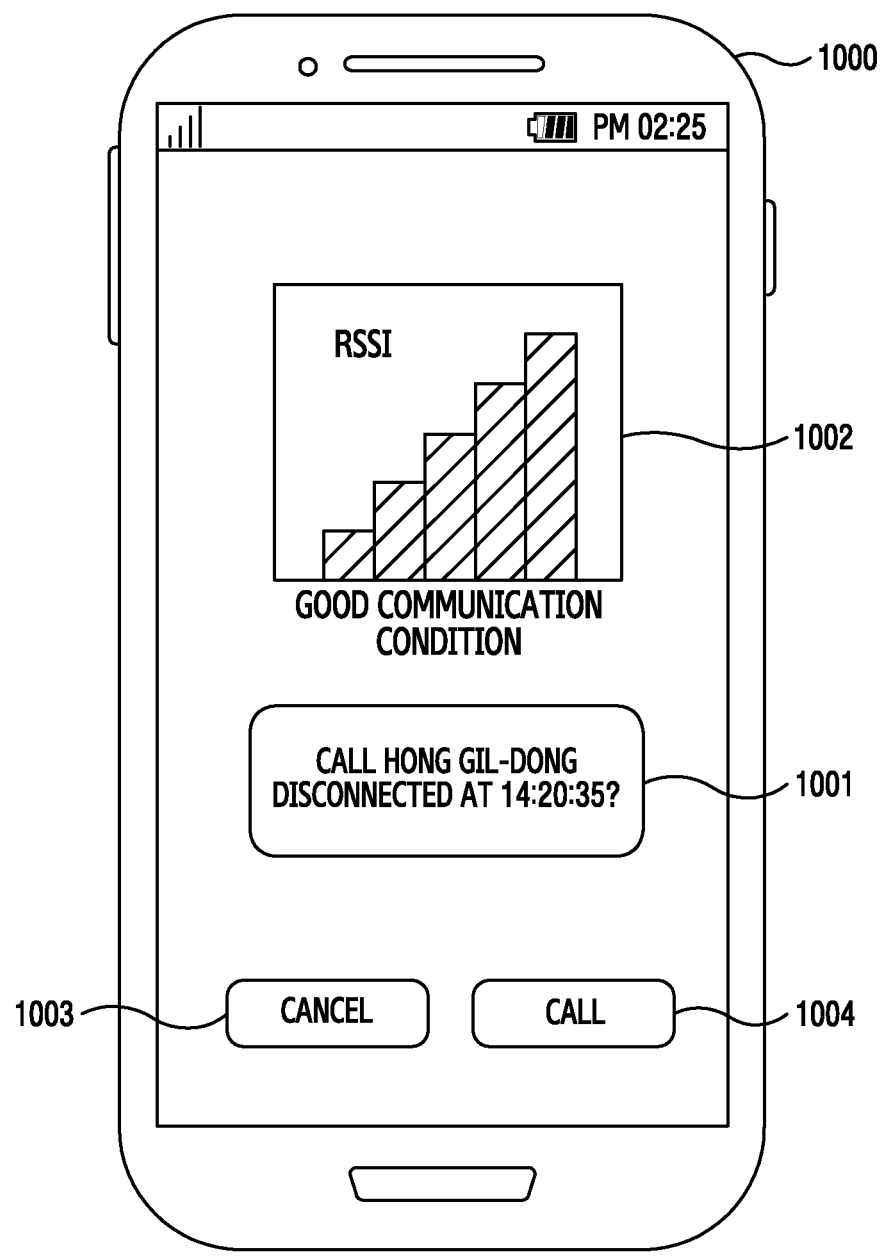
FIG. 10 illustrates a screen displaying an alarm message according to yet another example embodiment of the present disclosure.

Referring to FIG. 10, when the communication condition improves, the first electronic apparatus 1000 can display the call disconnection time and an alarm message 1001 querying whether to attempt redialing to the user of the second electronic apparatus, as shown in FIG. 10. The first electronic apparatus 1000 may also display a particular image 1002 indicating a good communication receptivity condition, an option 1003 allowing the user of the first electronic apparatus 1000 to redial, and a cancel option 1004 terminating a relevant function.

When anticipating the call disconnection due to the network service error (such as, for example, when the RSSI exceeds the reference value and a network connection is unstable), the processor 120 of the first electronic apparatus may anticipate the impending call disconnection due to the network service error.

The processor 120 of the first electronic apparatus may generate a call disconnection message including a comment indicating that the abnormal call disconnection was caused by the network service error, and immediately transmit the call disconnection message to the second electronic apparatus.

Figure 11:
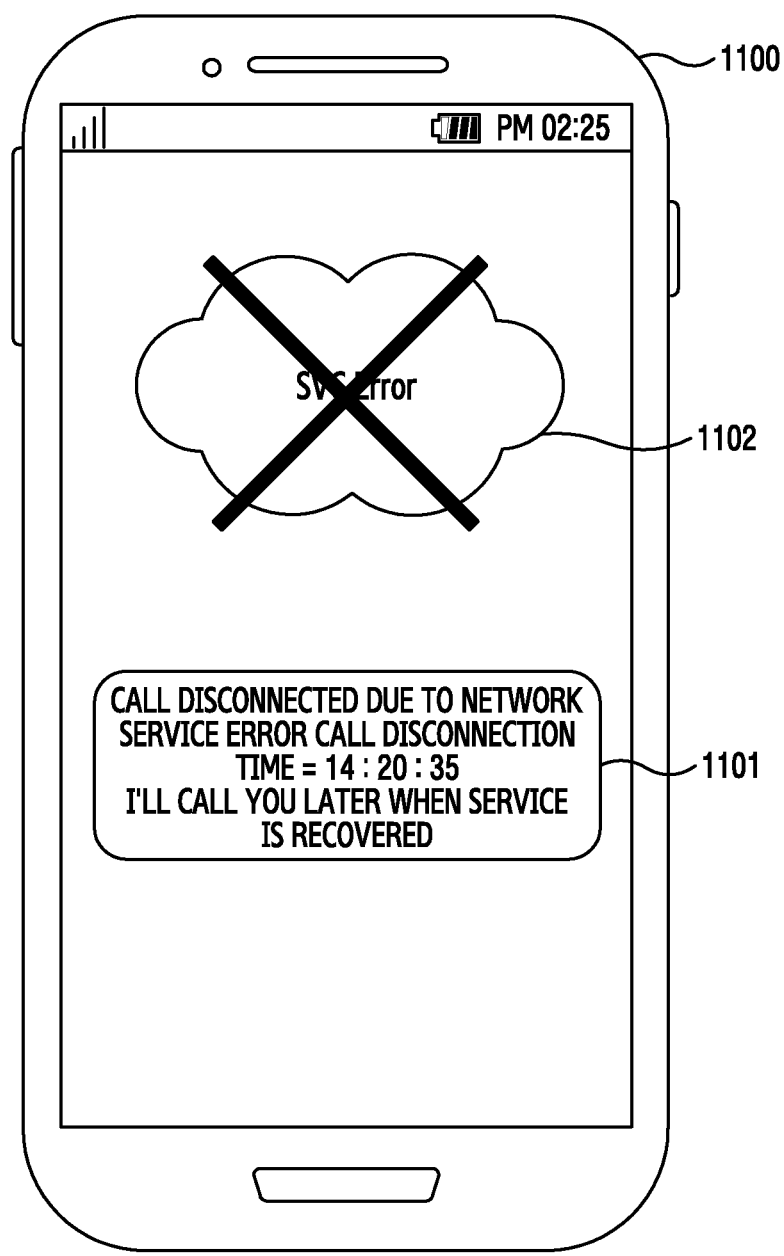
FIG. 11 illustrates a screen displaying a call disconnection message according to still another example embodiment of the present disclosure.

For example, referring now to FIG. 11, a second electronic apparatus 1100 receiving the call disconnection message may display a comment about the call disconnection anticipated due to the network service error, an anticipated call disconnection time, and a call disconnection message 1101 of various content, such as "I'll call you later when the network service is recovered" as shown in FIG. 11. The second electronic apparatus 1100 may also display a particular image 1102 indicating the network service error causing the call disconnection.

Figure 12:
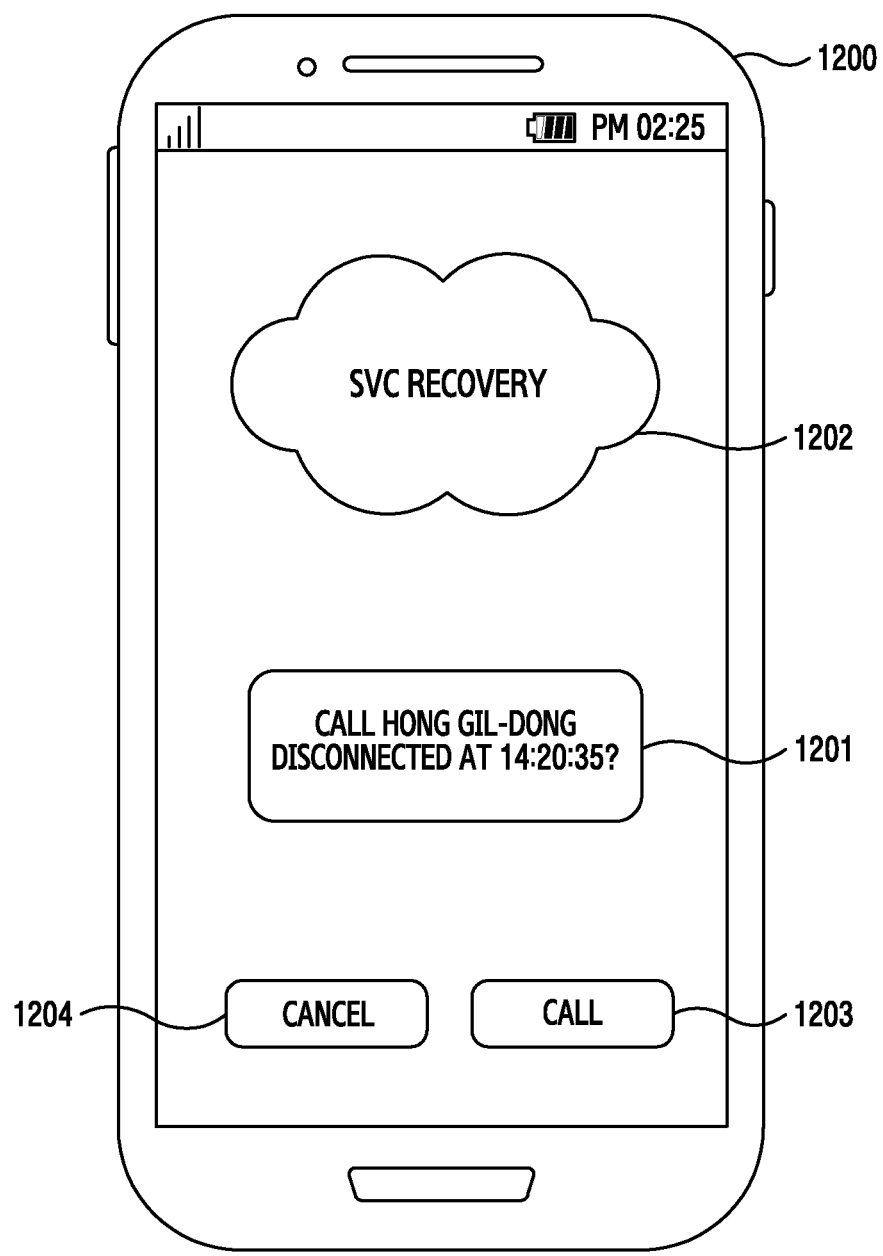
FIG. 12 illustrates a screen displaying an alarm message according to still another example embodiment of the present disclosure.

Referring now to FIG. 12, when the network service has sufficiently recovered, the first electronic apparatus 1200 may display the call disconnection time and an alarm message 1201 querying whether to redial the user of the second electronic apparatus, as shown in FIG. 12. The first electronic apparatus 1200 may also display a particular image 1202 indicating that the network service has recovered, an option 1203 allowing the user of the first electronic apparatus 1200 to easily make a call, and a cancel option 1204 terminating a relevant function.

Figure 13:
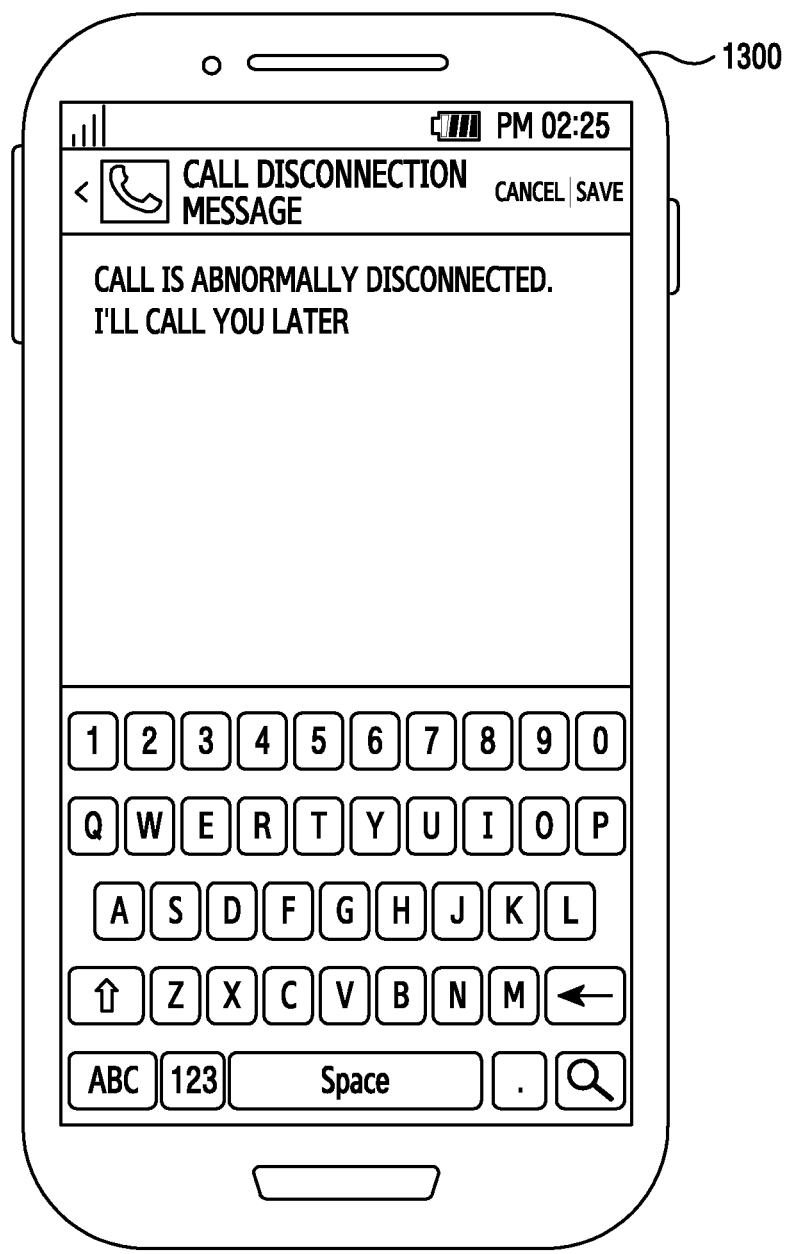
FIG. 13 illustrates a user interface screen for creating a call disconnection message according to an example embodiment of the present disclosure.

As shown in FIG. 13, the processor 120 of the first electronic apparatus may provide a User Interface (UI) screen 1300 allowing the user to arbitrarily create or edit their call disconnection message.

The processor 120 of the first electronic apparatus may store the user's call disconnection message generated via use of the UI screen. When an abnormal call disconnection occurs or a call disconnection is anticipated, the processor 120 of the first electronic apparatus can automatically extract and transmit the stored call disconnection message to the second electronic apparatus.

Prior to transmitting the call disconnection message, the processor 120 of the first electronic apparatus may display the call disconnection message for user confirmation or further editing, and then transmit the call disconnection message to the second electronic apparatus.

Figure 14:
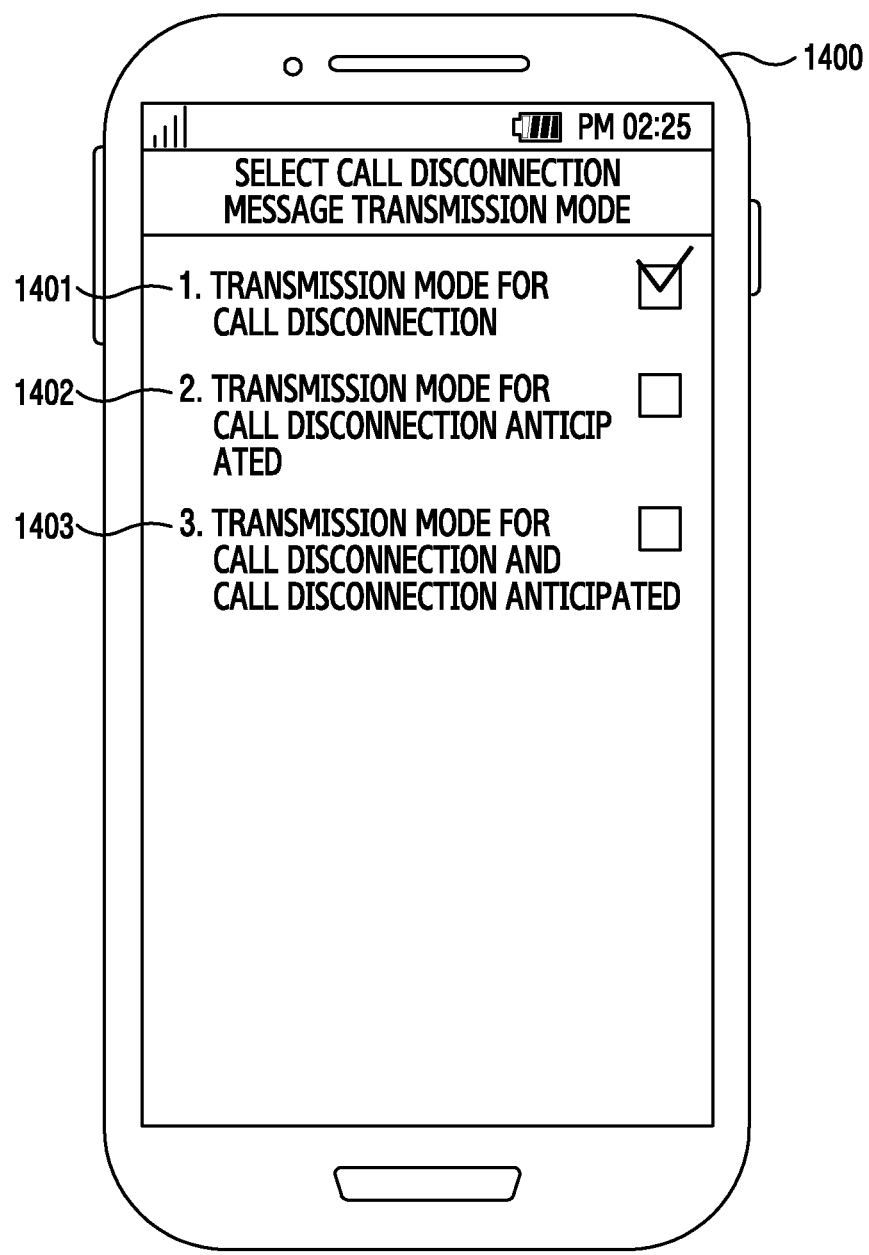
FIG. 14 illustrates a user interface screen for selecting a call disconnection message transmission mode according to an example embodiment of the present disclosure.

Referring to FIG. 14, for example, the processor 120 of the first electronic apparatus may provide a UI screen 1400 allowing selection of one of various call disconnection message transmission modes, as shown in FIG. 14. The UI screen 1400 may display user selection items for selecting a transmission mode 1401 in which the call disconnection occurs, a transmission mode 1402 in which the call disconnection is anticipated, and a transmission mode 1403 in which the call disconnection occurs and is anticipated.

Figure 15:
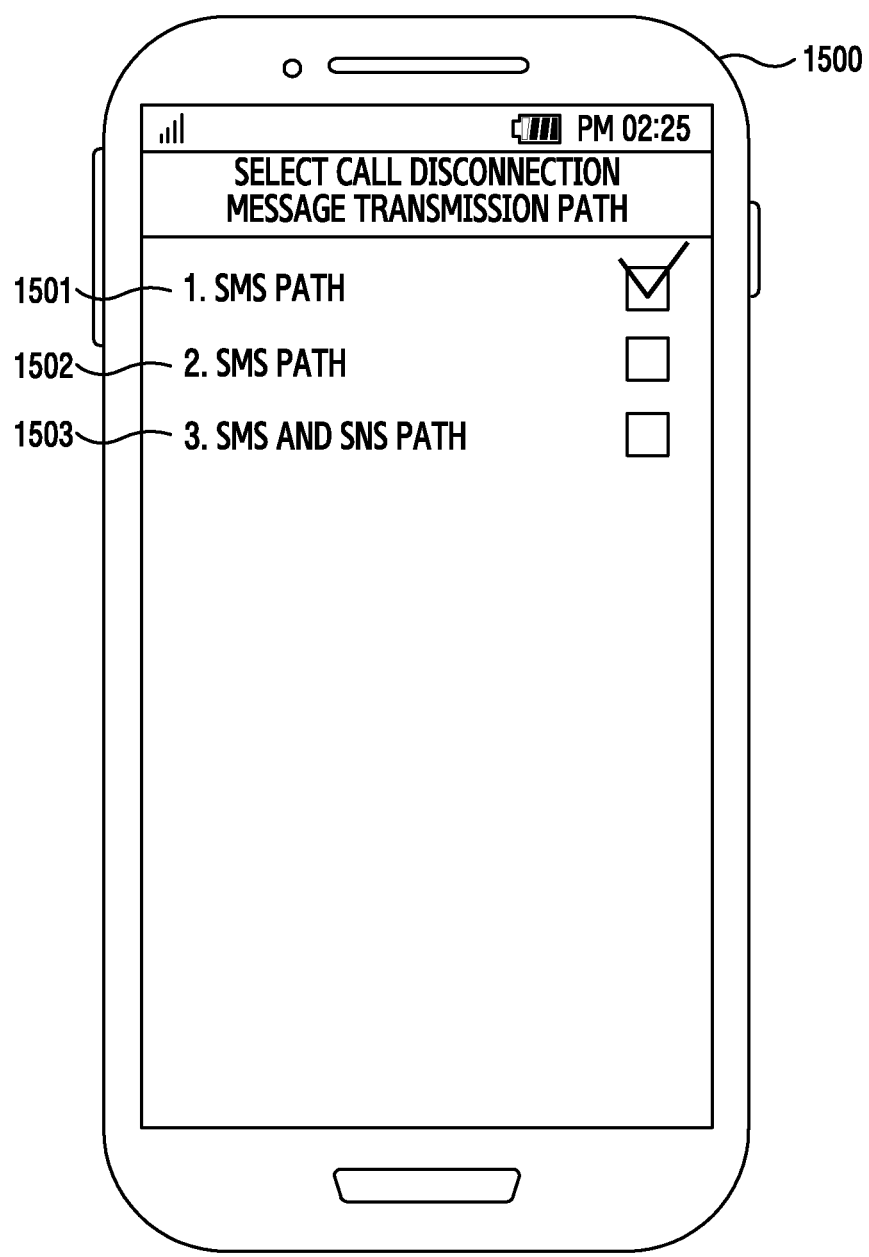
FIG. 15 illustrates a user interface screen for selecting a call disconnection message transmission path according to an example embodiment of the present disclosure.

Referring now to FIG. 15, for example, the processor 120 of the first electronic apparatus may provide a UI screen 1500 facilitating selection of one of various call disconnection message transmission paths, as shown in FIG. 15. The UI screen 1500 may display user selection items for selecting an SMS path mode 1501, a Social Network Service (SNS) path mode 1502, and an SMS and SNS path mode 1503.

When the call is disconnected or the call disconnection is anticipated, the processor 120 of the first electronic apparatus may variously transmit the call disconnection message to the second electronic apparatus using the SMS or the SNS according to the call disconnection message transmission mode and path selected by the user.

Hence, the user of the second electronic apparatus may receive the message and be notified of the call disconnection cause. Therefore, it is possible to avoid an unnecessary misunderstanding due to the abnormal call disconnection and prevent inefficient redial attempts.

As set forth above, when the abnormal call disconnection occurs or the call disconnection is anticipated, various electronic apparatuses such as a smart phone or a tablet PC sends the message including the call disconnection cause to the other electronic apparatus. Therefore, the user of the other electronic apparatus can obtain the call disconnection cause, thus avoiding an unnecessary misunderstanding and an inefficient call attempt due to the abnormal call disconnection.

The methods as described in the claims and/or the specification of example embodiments of the present disclosure can be implemented using hardware, software, or a combination of them. As for the software, a computer-readable storage medium storing one or more programs (software modules) may be provided. One or more programs stored in the computer-readable storage medium may be configured for execution by one or more processors of a server or the electronic apparatus. One or more programs include instructions for controlling the electronic apparatus to execute the methods according to the example embodiments as described in the claims and/or the specification of the present disclosure.

Such a program (software module, software) may be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the programs may be stored to a memory combining part or all of those recording media. A plurality of memories may be equipped.

The programs may be stored in an attachable storage device accessible via a communication network such as Internet, Intranet, Local Area Network (LAN), Wide LAN (WLAN), or Storage Area Network (SAN), or a communication network by combining these networks. The storage device can access the electronic apparatus through an external port. A separate storage device may access a portable electronic apparatus over a communication network.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. §101.

While the disclosure has been shown and described with reference to certain example embodiments thereof, it will be understood by those skilled in the art that various changes in form and details may be made therein without departing from the disclosure as defined by the appended claims and their equivalents.

What is claimed is:

1. A method in an electronic apparatus, comprising:
    detecting a disconnection of a call with an external electronic apparatus including at least one of a decrease in a Received Signal Strength Indication (RSSI) and a network service error during the call with the external electronic apparatus;
    when the disconnection is detected, generating and storing a call disconnection message including a notifier text indicating a cause for the disconnection before transmitting the call disconnection message; and
    in response to detecting a condition indicating communication receptivity after the disconnection, transmitting the stored call disconnection message to the external electronic apparatus,
    wherein when the network service error is detected, the call disconnection message further includes an image representative of a particular network service error causing the disconnection, and
    wherein the image is displayed to a display of the external electronic apparatus with the notifier text included in the call disconnection message.

2. The method of claim 1, wherein the stored call disconnection message further comprising is transmitted to the external electronic apparatus in response to detecting at least one of an increase in the RSSI and a recovery of a network service after detecting the disconnection.

3. The method of claim 1, wherein the notifier text further indicates at least one of the decrease of the RSSI and the network service error.

4. The method of claim 1, wherein the call disconnection message is transmitted to the external electronic apparatus using at least one of a Short Message Service (SMS), and a Social Network Service (SNS).

5. The method of claim 1, further comprising:
    displaying, by a display unit of the electronic apparatus, an alarm including a dialogue selectable to execute redialing the external electronic apparatus after transmitting the call disconnection message.

6. A method in an electronic apparatus, comprising:
    detecting an impending call disconnection during a call with an external electronic apparatus including at least one of a decrease in Received Signal Strength Indication (RSSI) and a network service error during the call with the external electronic apparatus;
    when the disconnection is detected, generating and storing a call disconnection message including a notifier text indicating a cause for the disconnection before transmitting the call disconnection message; and
    in response to detecting a condition indicating communication receptivity after the disconnection, transmitting the stored call disconnection message to the external electronic apparatus,
    wherein when the network service error is detected, the call disconnection message further includes an image representative of a particular network service error causing the disconnection, and
    wherein the image is displayed to a display of the external electronic apparatus with the notifier text included in the call disconnection message.

7. The method of claim 6, wherein the notifier text indicates at least one of the decrease of the RSSI and the network service error.

8. The method of claim 6, further comprising:
    after detecting the disconnection, displaying by a display unit of the electronic apparatus an alarm including a dialogue selectable to execute redialing to the external electronic apparatus according to at least one of a RSSI increase and a network service recovery.

9. An electronic apparatus comprising:
    a communication module executing a call with an external electronic apparatus; and
    a processor, configured to:
    detect disconnection of the call with the external electronic apparatus including at least one of a decrease in a Received Signal Strength Indication (RSSI) and a network service error during the call,
    when the disconnection is detected, generate and store a call disconnection message including a notifier text indicating a cause for the disconnection before transmitting the call disconnection message, and
    in response to detecting a condition indicating communication receptivity after the disconnection, transmit the stored call disconnection message to the external electronic apparatus,
    wherein when the network service error is detected, the call disconnection message further includes an image representative of a particular network service error causing the disconnection, and
    wherein the image is displayed to a display of the external electronic apparatus with the notifier text included in the call disconnection message.

10. The electronic apparatus of claim 9, wherein the stored call disconnection message is transmitted to the external electronic apparatus in response to detecting at least one of an increase in the RSSI and a recovery of the network service after detecting the disconnection.

11. The electronic apparatus of claim 9, wherein the notifier text indicates at least one of the decrease in the RSSI and the network service error.

12. The electronic apparatus of claim 9, wherein the processor is further configured to transmit the call disconnection message to the external electronic apparatus using at least one of a Short Message Service (SMS), and a Social Network Service (SNS).

13. The electronic apparatus of claim 9, wherein the processor is further configured to control a display of the electronic apparatus to display an alarm including a dialogue selectable to execute redialing the external electronic apparatus after transmitting the call disconnection message.

14. An electronic apparatus comprising:
a communication module executing a call with an external electronic apparatus; and
at least one processor configured to:
detect an impending call disconnection during the call with the external electronic apparatus including at least one of a decrease in Received Signal Strength Indication (RSSI) and a network service error during the call with the external electronic apparatus,
when the disconnection is detected, generate and store a call disconnection message to the external electronic apparatus before transmitting the call disconnection message, and
in response to detecting a condition indicating communication receptivity after the disconnection, transmitting the stored call disconnection message to the external electronic apparatus,
wherein when the network service error is detected, the call disconnection message further includes an image representative of a particular network service error causing the disconnection, and
wherein the image is displayed to a display of the external electronic apparatus with a notifier text included in the call disconnection message.

15. The electronic apparatus of claim 14,
wherein the notifier text indicates that the cause is associated with at least one of the decrease in RSSI and the network service error.

16. The electronic apparatus of claim 14, wherein the at least one processor is further configured to control a display unit of the electronic apparatus to display an alarm including a dialogue selectable to execute redialing the external electronic apparatus according to at least one of an increase in the RSSI and a recovery of a network service after the call disconnection.

17. A non-transitory computer-readable storage medium comprising program instructions executable by a processor of an electronic apparatus to:
detect a call disconnection during a call with an external electronic apparatus including at least one of a decrease in Received Signal Strength Indication (RSSI) and a network service error during the call with the external electronic apparatus;
when the call disconnection is detected, generate and store a call disconnection message including a notifier text indicating a cause for the disconnection before transmitting the call disconnection message; and
in response to detecting a condition indicating communication receptivity after the disconnection, transmit the stored call disconnection message to the external electronic apparatus,
wherein when the network service error is detected, the call disconnection message further includes an image representative of a particular network service error causing the disconnection, and
wherein the image is displayed to a display of the external electronic apparatus with the notifier text included in the call disconnection message.

* * * * *